US010009881B2

United States Patent
Davydov et al.

(10) Patent No.: US 10,009,881 B2
(45) Date of Patent: Jun. 26, 2018

(54) MECHANISM FOR 256-QAM CAPABLE USER EQUIPMENT TO OPERATE SEAMLESSLY WITH A NODE

(71) Applicant: Intel Corporation, Santa Clara, CA (US)

(72) Inventors: Alexei Davydov, Nizhny Novgorod (RU); Hwan-Joon Kwon, Santa Clara, CA (US); Gregory V. Morozov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 14/716,846

(22) Filed: May 19, 2015

(65) Prior Publication Data

US 2015/0256287 A1    Sep. 10, 2015

Related U.S. Application Data

(63) Continuation of application No. 14/443,998, filed as application No. PCT/US2014/072145 on Dec. 23, 2014.

(Continued)

(51) Int. Cl.
*H04L 1/00* (2006.01)
*H04W 72/04* (2009.01)
(Continued)

(52) U.S. Cl.
CPC .......... *H04W 72/042* (2013.01); *H04B 7/028* (2013.01); *H04L 1/0003* (2013.01);
(Continued)

(58) Field of Classification Search
CPC ... H04B 1/10; H04B 4/08; H04B 7/02; H04B 7/04; H04B 7/06; H04B 7/0626;
(Continued)

(56) References Cited

U.S. PATENT DOCUMENTS

2012/0069793 A1    3/2012 Chung et al.
2014/0169297 A1*    6/2014 Kim ...................... H04L 5/0092
                                                                  370/329

(Continued)

FOREIGN PATENT DOCUMENTS

| EP | 3098993 | 11/2016 |
| WO | 2013123961 | 8/2013 |
| WO | 2015103630 | 7/2015 |

OTHER PUBLICATIONS

International Search Report and Written Opinion of the International Searching Authority for International Application No. PCT/US2014/072145 dated Apr. 15, 2015, 10 pages.

(Continued)

*Primary Examiner* — Shawkat M Ali
(74) *Attorney, Agent, or Firm* — Green, Howard & Mughal LLP.

(57) ABSTRACT

Described is a UE to communicate with an eNB on a network, the UE comprising: an antenna to receive messaging from eNB indicating switching to 256-QAM scheme from an existing non-256-QAM scheme; and a table component for storing soft channel bits based on $N_{soft}$ such that the number and value of the soft channel bits for using the 256-QAM scheme is substantially equal to the number and value of the soft channel bits when the UE is not using the 256-QAM scheme. Described is an eNB comprising: an antenna to transmit messaging to a UE indicating switching to 256-QAM scheme from an existing non-256-QAM scheme; and an encoder to encode data using memory usage size based on $N_{soft}$ such that the number and value of the $N_{soft}$ for using the 256-QAM scheme is substantially equal to the number and value of the $N_{soft}$ when the eNB is not using the 256-QAM scheme.

18 Claims, 7 Drawing Sheets

Related U.S. Application Data

(60) Provisional application No. 61/933,861, filed on Jan. 30, 2014.

(51) Int. Cl.

| | | |
|---|---|---|
| *H04W 76/27* | (2018.01) | |
| *H04L 27/34* | (2006.01) | |
| *H04B 7/02* | (2018.01) | |
| *H04L 27/36* | (2006.01) | |
| *H04W 76/04* | (2009.01) | |
| *H04L 27/00* | (2006.01) | |
| *H04L 27/38* | (2006.01) | |
| *H04W 84/04* | (2009.01) | |
| *H04W 88/02* | (2009.01) | |

(52) U.S. Cl.
CPC .......... *H04L 1/0013* (2013.01); *H04L 1/0025* (2013.01); *H04L 27/0008* (2013.01); *H04L 27/34* (2013.01); *H04L 27/36* (2013.01); *H04L 27/362* (2013.01); *H04L 27/38* (2013.01); *H04W 76/046* (2013.01); *H04W 76/27* (2018.02); *H04L 1/0009* (2013.01); *H04L 1/0061* (2013.01); *H04W 84/042* (2013.01); *H04W 88/02* (2013.01)

(58) Field of Classification Search
CPC ......... H04B 7/028; H04L 1/00; H04L 1/0003; H04L 1/0026; H04L 5/00; H04L 5/0042; H04L 12/18; H04L 27/34; H04L 27/36; H04L 27/362; H04L 27/3494; H04W 72/04; H04W 72/12; H04W 72/042; H04W 72/1284; H04W 72/1289
See application file for complete search history.

(56) References Cited

U.S. PATENT DOCUMENTS

| | | |
|---|---|---|
| 2014/0185530 A1 | 7/2014 | Kuchibhotla et al. |
| 2015/0016553 A1 | 1/2015 | Yang et al. |
| 2015/0195818 A1 | 7/2015 | Davydov et al. |
| 2015/0195819 A1 | 7/2015 | Kwon et al. |
| 2015/0256287 A1 | 9/2015 | Davydov et al. |
| 2016/0323912 A1 | 11/2016 | Nakamura et al. |
| 2016/0338024 A1 | 11/2016 | Xia et al. |

OTHER PUBLICATIONS

Hitachi Ltd., "Further Evaluation and Discussion on 256QAM", R1-134764, 3 GPP TSG RAN WGI #74bis, Guangzhou China, Sep. 28, 2013.

Qualcomm Inc., "New UE categories", RP-131162, 3GPP TSG-RAN meeting #61, Porto, Portugal, Aug. 28, 2013.

HTC, "On Small Cell Enhancement for Improved Spectral Efficiency", R1-130311, 3GPP TSG RAN WG1 Meeting #72, St. Julian's, Malta, Jan. 18, 2013.

Catt, "Analysis on specification impact of higher order modulation", R1-135079, 3GPP TSG RAN WG1 Meeting #75, San Francisco, CA USA, Nov. 1, 2013.

LG Electronics, "Specification impact of 256QAM support in downlink", R1-134401, 3GPP TSG RAN WG1 #74bis, Guangzhou, China, Sep. 28, 2013.

International Preliminary Report on Patentability for PCT Application No. PCT/US2014/072145 dated Aug. 11, 2016, 7 pages.

Office Action for U.S. Appl. No. 14/443,998, notified on Feb. 8, 2017.

Extended European Search Report for European Patent Application No. 14880985.8, dated Jul. 28, 2017.

Final Office Action for U.S. Appl. No. 14/443,998 notified Aug. 31, 2017.

Office Action for Korean Patent Application No. 10-20166-7017001, dated Jun. 12, 2017.

Ericsson,"On standard impacts to support 256QAM in downlink", 3GPP Draft; R1-135655, 3rd Generation Partnership Project; vol. RAN WG1, San Francisco, CA USA; retrieved from the Internet via www.3gpp.org/ftp/meetings_3GPP_SYNC/RAN/RAN1/Docs on Nov. 13, 2013.

Notice of Allowance for U.S. Appl. No. 14/443,998, dated Jan. 16, 2018.

Office Action for Japanese Patent Application No. 2016-535224 dated Jul. 14, 2017.

Fujitsu, "Evaluation assumptions for introduction of DL higher order modulation to small cell", 3 GPP TSG RAN WG1 Meeting #72, St. Julian's, Malta, Jan. 28-Feb. 1, 2013.

\* cited by examiner

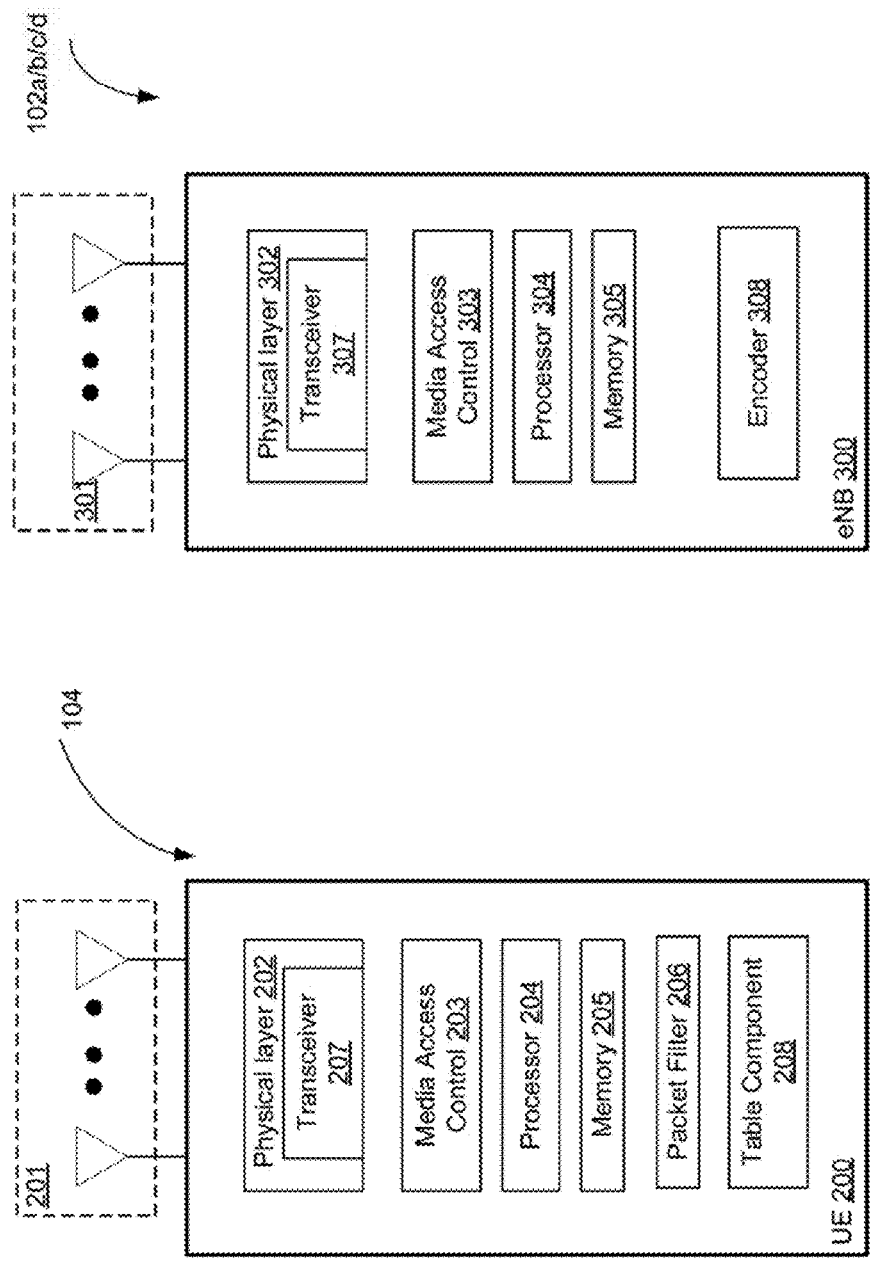

MECHANISM FOR 256-QAM CAPABLE USER EQUIPMENT TO OPERATE SEAMLESSLY WITH A NODE

CLAIM OF PRIORITY

This application is a continuation of, and claims priority to, U.S. patent application Ser. No. 14/443,998, filed on 19 May 2015, titled "MECHANISM FOR 256-QAM CAPABLE USER EQUIPMENT TO OPERATE SEAMLESSLY WITH A NODE," which is a national stage application under 35 U.S.C. § 371 of International Patent Application PCT No. PCT/US14/72145, filed on 23 Dec. 2014, titled "MECHANISM FOR 256-QAM CAPABLE USER EQUIPMENT TO OPERATE SEAMLESSLY WITH A NODE," and which claims priority to U.S. Provisional Patent Application Ser. No. 61/933,861, filed Jan. 30, 2014, which are incorporated by reference in their entireties.

BACKGROUND

Demand for wireless broadband data is ever increasing. High geometry experienced by a User Equipment (UE) in some Long Term Evolution Advance (LTE-A) compliant small cell deployments provide the possibility for using a higher order modulation scheme (e.g., a 256 Quadrature Amplitude Modulation (QAM) scheme) for the downlink transmission. However, support of the additional higher order modulation scheme requires some changes in the existing downlink control signaling.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 2 illustrates a block diagram of a User Equipment (UE) with mechanisms to support seamless operation for 256-QAM coding scheme, according to some embodiments of the disclosure.

FIG. 3 illustrates a block diagram of an eNB with mechanisms to support seamless operation for 256-QAM coding scheme, according to some embodiments of the disclosure.

DETAILED DESCRIPTION

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical or wireless connection between the things that are connected, without any intermediary devices. The term "coupled" means either a direct electrical or wireless connection between the things that are connected or an indirect connection through one or more passive or active intermediary devices. The meaning of "a," "an," and "the" include plural references. The meaning of "in" includes "in" and "on."

The terms "substantially," "close," "approximately," "near," and "about," generally refer to being within +/−20% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Figure 1A:
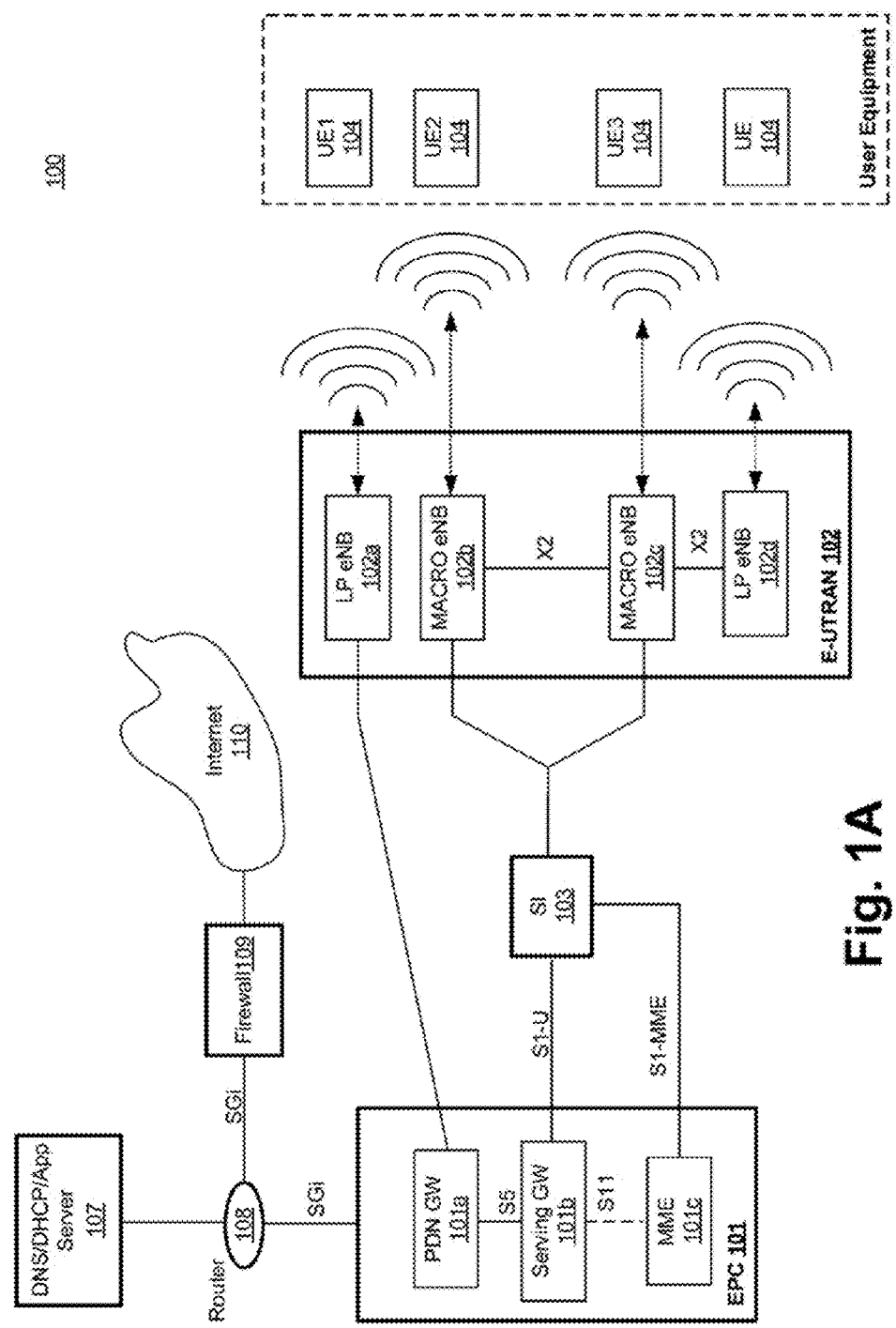
FIG. 1A illustrates a section of an end-to-end network architecture of a Long Term Evolution Advance (LTE-A) network with various components of the network to support seamless operation for a 256 Quadrature Amplitude Modulation (256-QAM) coding scheme, according to some embodiments of the disclosure.

FIG. 1A illustrates a section of an end-to-end network architecture 100 of a Long Term Evolution Advance (LTE-A) network with various components of the network to support seamless operation for 256 Quadrature Amplitude Modulation (256-QAM) coding scheme, according to some embodiments of the disclosure.

In some embodiments, network architecture 100 comprises core network 101, Radio Access Network (RAN) 102, Interface 103, Dynamic Host Configuration Protocol (DHCP) Application (App.) Server or Domain Name System (DNS) App. Server 107, Router 108, Firewall 109, and Internet 110.

Example of core network 101 is an Evolved Packet Core (EPC), also referred to as a System Architecture Evolution (SAE) core. An example of RAN 102 is an Evolved Universal Mobile Telecommunications System (UMTS) Terrestrial Radio Access Network (E-UTRAN). An example of Interface 103 is an SI interface. So as not to obscure the various embodiments, only a section of core network 101, as well as the RAN 102, is illustrated. Core network 101 includes Packet Data Network Gateway (PDN GW or PGW) 101a, Serving Gateway (serving GW, or SGW) 101b, and Mobility Management Entity (MME) 101c. The interface between PGW 101a and SGW 101b is S5. The interface between SGW 101b and MME 101c is S11.

PDN GW 101a (which is also referred to here as PGW) terminates a SGi interface toward the packet data network (PDN). PDN GW 101a routes data packets between EPC 101 and the external PDN (not shown), and may be a key node for policy enforcement and charging data collection. It may also provide an anchor point for mobility with non-LTE network accesses. The external PDN can be any kind of Internet Protocol (IP) network, as well as an IP Multimedia Subsystem (IMS) domain. In some examples, PDN GW 101a and Serving GW 101b may be realized in one physical node. In some examples, PDN GW 101a and Serving GW 124 may be realized in separate physical nodes as well.

Serving GW 101b (which is also referred to here as SGW) terminates the interface toward RAN 102. In addition, Serving GW 101b routes data packets between RAN 102 and core network 101. SGW 101b may be a local anchor point for handovers between eNBs.

MME 101c is similar in function to the control plane of legacy Serving General Packet Radio Service (GPRS) Support Nodes (SGSN). MME 101c manages mobility aspects in access such as gateway selection and tracking area list management. SGW 101b and MME 101c may be realized in one physical node or also in separate physical nodes.

RAN 102 (which is also referred to here as E-UTRAN 102) includes Enhanced/Evolved Node B's (abbreviated as eNodeB or eNB) 102a/b/c/d (which may function as base stations) for communicating with one or more UEs 104. eNBs 102a/b/c/d are comprised of MACRO eNBs 101b/c and Low Power (LP) eNBs 102a/d. eNB is an element in E-UTRA of the LTE standard that is the evolution of the element Node B in UMTS Terrestrial Radio Access (UTRA) of UMTS. UMTS is a third generation mobile cellular system for networks based on the Global System for Mobile Communications (GSM) standard. It is the hardware that is connected to the mobile phone network that communicates directly with the UEs, like a base transceiver station (BTS) in GSM networks. Traditionally, a Node B has minimum functionality, and is controlled by a Radio Network Controller (RNC). However, with an eNB, there is no separate controller element. This simplifies the architecture and allows lower response times.

The eNB interfaces with the SAE core (also known as the EPC) and other eNBs. For example, eNB 102b uses the S1-AP protocol on the S1-MME interface with MME 101c for control plane traffic. The eNB also uses the GPRS Tunneling Protocol (GTP-U), which is the defining IP-based protocol of the GPRS core network protocol on the S1-U interface with the SGW for user plane traffic. Collectively, the S1-MME and S1-U interfaces are known as the S1 interface 103, which represent the interface from eNB 102b/c to EPC 101.

The eNBs (e.g., MACRO 102b/c and LP 102a/d) conclude the air interface protocol. The eNBs may be the first point of contact for UE 104. In some embodiments, the eNB may perform various logical roles for RAN 102 including RNC functions such as data packet scheduling, mobility management, radio bearer management, and uplink and downlink dynamic radio resource management. An embodiment of eNB 102a/b/c/d is described with reference to FIG. 3.

Referring back to FIG. 1A, in some embodiments, UEs 104 may be arranged to communicate using Orthogonal Frequency-Division Multiplexing (OFDM) communication signals with an eNB 102a/b/c/d over a multicarrier communication channel according to an OFDM communication technique. The OFDM signals may include a myriad of orthogonal subcarriers. OFDM is a method of encoding digital data on multiple carrier frequencies.

In some embodiments, UE 104 is any device used directly by an end-user to communicate. It can be a handheld telephone, a laptop computer equipped with a mobile broadband adapter, or any other device. UE 104 connects to the base station, for example, Node B/eNodeB 102a as specified in the ETSI 125/136-series and 3GPP 25/36-series of specifications. UE 104 roughly corresponds to the mobile station (MS) in GSM systems. Various bearers (i.e., carriers) are used to provide End-to-End Service from UE 104 to Internet 110, for example. An embodiment of UE 104 is described with reference to FIG. 2 and FIG. 8.

Referring back to FIG. 1A, in some embodiments, S1 interface 103 is the interface that separates RAN 102 from EPC 101. S1 interface 103 is split into two parts. In the first part, the S1-U carries traffic data between eNBs 102b/c and SGW 101b. The second part is the S1-MME, a signaling interface between the eNBs 102b/c and the MME 101c. The X2 interface is the interface between eNBs 102b/c. The X2 interface includes—two parts, the X2-C and X2-U. The X2-C is the control plane interface between eNBs 101b/c and the X2-U is the user plane interface between the eNBs 101b/c.

LTE networks may be classified as homogeneous and heterogeneous networks. In homogeneous networks, the eNB may be macro eNB 101b/c or macro cell 101b/c. Macro eNB 101b/c may provide wireless coverage to the UEs in a cell. The term "cell" here generally refers to the coverage range in which the UEs communicate with the macro node. In contrast to homogeneous networks, the heterogeneous networks may handle high traffic loads on macro eNB 101b/c. This high traffic load may be due to increased usage and functionality of UEs 104. Heterogeneous networks may include overlapping macros. For example, a layer of planned high power macro nodes (macro-eNBs or macro cells) may be overlaid with layers of Low Power (LP) eNBs 101a/d. LP eNBs 101a/d may be deployed in a less well-planned or even entirely uncoordinated manner within the coverage area/range (i.e., cell) of a macro eNB 101b/c.

The LP nodes also referred to as LP cells, small cells, small nodes, or low power nodes, are usually used to extend coverage to indoor areas where outdoor signals do not reach well. LP cells are also used to add network capacity in areas with very heavy phone usage such as airports. The term LP eNB refers to any lower power eNB for implementing a narrower cell (i.e., narrower than a macro cell) such as a femtocell (or femto-eNB), picocell (or pico-eNB), or microcell (micro-eNB), small-eNBs, home eNBs, etc. Femtocell eNBs are normally provided by a mobile network operator to its residential or commercial customers. A femtocell is generally the size of a residential gateway. It typically connects to the user's broadband line. When the femtocell is plugged in the broadband line, it connects to the mobile operator's mobile network. The connected femtocell then provides extra coverage of, for example, 30 to 50 meters for residential femtocells. Therefore, an LP eNB (e.g., 102*a/d*) may be a femtocell eNB since it is coupled through PGW 101*a*.

Likewise, a picocell is a wireless communication system usually covering a small area, such as corporate offices, shopping areas, or aircrafts, etc. A picocell eNB can couple through the X2 link to another eNB. For example, a picocell eNB can couple to a macro eNB 102*b* through its Base Station Controller (BSC). Therefore, LP eNB (e.g., 102*a/d*) may be realized with a picocell eNB. One reason for realizing LP eNB 101*a* with a picocell eNB is that the LP eNB is coupled to a macro eNB 102*c* via an X2 interface. Picocell eNBs or other LP eNBs may incorporate some or all features of a macro eNB. In some cases, picocell eNBs or other LP eNBs are referred to as an Access Point (AP), base station (BS), or enterprise femtocell.

In addition to increasing coverage and/or load capacity, the proximity to a node and favorable geometry experienced by UEs in some small cell deployments provide the possibility for using Higher Order Modulation (HOM) schemes for the downlink transmission. For example, current modulation schemes in 3GPP peak at 64 QAM while the improved proximity and geometry may allow for 256-QAM.

In some cases, a downlink resource grid is used for downlink transmissions from an eNB 102*a/b/c/d* to a UE 104. The downlink resource grid may be a time-frequency grid. The time-frequency grid is a physical resource in the downlink in each slot. Such a time-frequency plane representation is used for OFDM systems. The time-frequency resource grid is formed of columns and rows. Each column and each row of the time-frequency resource grid correspond to one OFDM symbol and one OFDM subcarrier, respectively.

In the time domain, the duration of the time-frequency resource grid in the time domain corresponds to one slot in a radio frame. The smallest time-frequency unit in a time-frequency resource grid is designated as a resource element. Each time-frequency resource grid includes a number of resource blocks. The resource blocks describe the mapping of particular physical channels to resource elements. Each resource block includes a collection of resource elements. In the frequency domain, the collection of resource elements represent the smallest quanta of currently allowable resources. There are many different physical downlink channels which are conveyed via such resource blocks. For example, physical downlink channels can be the Physical Downlink Shared Channel (PDSCH) and the Physical Downlink Control Channel (PDCCH).

The PDSCH carries user data to UE 104. PDSCH also carries higher-layer signaling to UE 104 (e.g., UE1). The PDCCH carries resource allocations related to the PDSCH and information about the transport format. PDCCH also informs UE 104 about the resource allocation, transport format, and Hybrid Automatic Repeat Request (H-ARQ) information related to the uplink shared channel. Generally, downlink scheduling (i.e., assigning control and shared channel resource blocks to UEs 104 within a cell) is performed at the eNB (e.g., one or more eNBs 102*a/b/c/d*). This downlink scheduling is based on channel quality information fed back from UEs 104 to eNB 102*a/b/c/d*. The downlink resource assignment information is then sent to a UE 104 (e.g., UE1) on the control channel (i.e., PDCCH) which is used for (or assigned to) UE 104.

To convey the control information, the PDCCH uses Control Channel Elements (CCEs). The PDCCH complex-valued symbols are first organized into quadruplets before being mapped to resource elements. The quadruplets are then permuted using a sub-block inter-leaver for rate matching. Each PDCCH is transmitted using one or more of these CCEs. Each CCE corresponds to nine sets of four physical resource elements. These sets of physical resource elements are known as Resource Element Groups (REGs). In one example, four Quadrature Phase Shift Keying (QPSK) symbols are mapped to each REG. Depending on the size of the Downlink Control Information (DCI) and the channel condition, the PDCCH can be transmitted using one or more CCEs.

In LTE downlink, the eNB (e.g., eNB 102*a/b*) periodically transmits one or more synchronization signals and signals carrying system information. Examples of the one or more synchronization signals are Primary Synchronization Signals (PSS) and Secondary Synchronization Signals (SSS). Examples of signals carrying system information are Physical Broadcast Channel (PBCH) signals. LTE downlink transmission contains Common Reference Signals (CRS) in every sub frame even if the sub frames are empty (i.e., when no data is being transmitted).

A UE (e.g., UE 104) first acquires a Physical Cell Identifier (PCI), frame synchronization information, and time slot to read system information blocks from the eNB. If UE 104 is currently tuned to a specific frequency channel, it reads PSS to synchronize on a sub-frame level. PSS is periodically transmitted by eNB 102*a/b*. So, UE 104 is synchronized regularly (or periodically) with eNB 102*a/b*. UE 104 then reads the SSS which is located in the same sub frame as PSS. UE 104 achieves a physical layer cell identity group number from the SSS. SSS is periodically transmitted by eNB 102*a/b*. So, UE 104 is regularly (or periodically) synchronized with eNB 102*a/b* using SSS. Once UE 104 knows the PCI for a given cell, it also knows the location of cell Reference signals such as CRS. Reference signals are used in channel estimation, cell selection, cell reselection, and handover procedures.

To support additional modulation schemes (e.g., 256-QAM) in LTE networks, downlink control signaling formats may have to change for indicating a Modulation and Coding Scheme (MCS). Likewise, Uplink Control Information (UCI) signaling formats may have to be changed for reporting a Channel Quality Indicator (CQI) for a link quality corresponding to the additional modulation scheme (e.g., 256-QAM).

Current modulation schemes in the 3GPP extend up to 64-QAM. However, the high geometry experienced by UEs in some small cell deployments provides the possibility for using a higher order modulation scheme (e.g., 256-QAM). In some cases, straightforward extension of the existing signaling, by adding additional bits in the corresponding fields of the downlink and uplink control information, is not desirable. The straightforward extension of the existing signaling is not desirable because of the additional signaling overhead and potential negative impact on the uplink coverage for some of the uplink control messages (e.g., Physical Uplink Control Channel (PUCCH)).

In a conventional system, the rate matching pattern is derived based on the UE's capability of storing soft channel bits (i.e., based on $N_{soft}$). During Radio Resource Control (RRC) configuration of the 256-QAM (i.e., RRC configuration ambiguity period as described with reference to FIG. 4), the actual value of $N_{soft}$ (which is used to derive the rate matching pattern) can be different on the eNB and the UE. This mismatch in the value of $N_{soft}$ may prevent correct PDSCH demodulation during that ambiguity period. To address the problem, in some embodiments, the same $N_{soft}$ is used to derive the rate matching pattern regardless of the 256-QAM configuration and the 256-QAM support at the UE. In such embodiments, UE 104 uses the same $N_{soft}$ value as $N_{soft}$ of the associated UE not supporting the 256-QAM scheme for determination of the rate matching pattern.

In some embodiments, the mechanism described here allows UE 104 to avoid ambiguity in the rate matching pattern during configuration of 256-QAM at the expense of additional discarding of the parity bits for 256-QAM MCSs. In such embodiments, correct demodulation of PDSCH is facilitated during RRC configuration of 256-QAM.

Figure 1B:
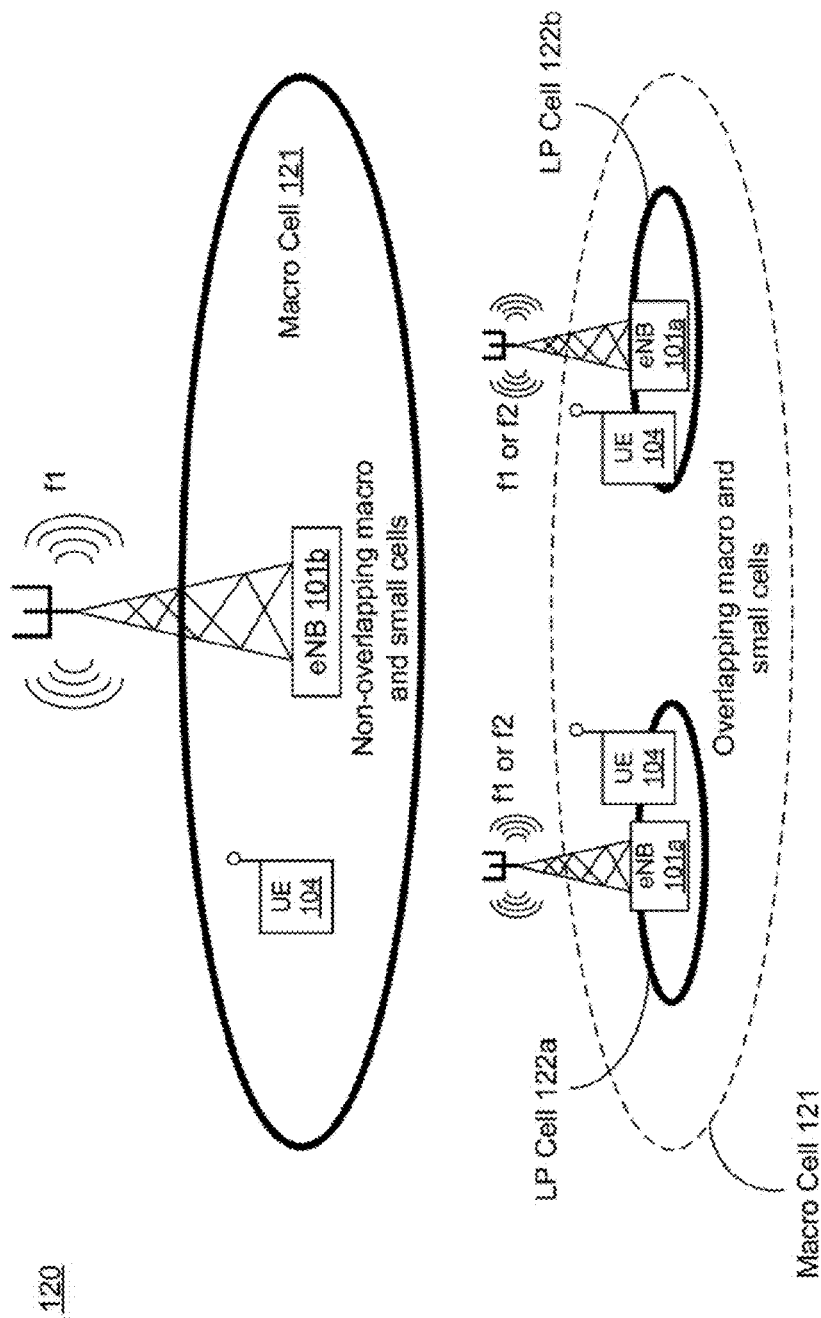
FIG. 1B illustrates a scenario of an LTE-A network with Macro Enhanced/Evolved Universal Mobile Telecommunications System (UMTS) Terrestrial Radio Access Network (E-UTRAN) Node B (eNB) and Low Power (LP) eNBs that can support seamless operation for 256-QAM coding scheme, according to some embodiments of the disclosure.

FIG. 1B illustrates scenario 120 of an LTE-A network with Macro eNB 101b and LP eNBs 101a that can support seamless operation for 256-QAM coding scheme, according to some embodiments of the disclosure. It is pointed out that those elements of FIG. 1B having the same reference numbers (or names) as the elements of any other figure can operate or function in any manner similar to that described, but are not limited to such.

Here, Macro Cell 121 is served by Macro eNB 101b while LP Cells 122a and 122b are served by LP eNBs 101a. One reason for having LP Cells 122a and 122b is to improve throughput in small zones for servicing local UEs 104. In some cases, Macro Cell 121 is a non-overlapping cell (i.e., Macro Cell 121 does not overlap small cells 122a and 122b) as shown in the top cell of scenario 120. In some cases, Macro Cell 121 overlaps small cells 122a and 122b as shown by the dotted cell boundary in the bottom cell of scenario 120. Macro eNB 101b may transmit signals to UE 104 using carrier frequency f1 while LP eNBs 101a may transmit signals to their local UEs 104 within their respective cells using carrier frequencies f1 or f2. In some examples, f2 may be higher than f1. For example, f2 is 3.5 GHz and f1 is 2 GHz.

In some embodiments, UE 104 receives messaging from eNB 101b indicating switching to the 256-QAM scheme from an existing non-256-QAM scheme. In some embodiments, in response to receiving such messaging, UE 104 uses soft channel bits based on $N_{soft}$ such that the number and value of the soft channel bits for using the 256-QAM scheme is substantially equal to the number and value of the soft channel bits when the UE is not using the 256-QAM scheme.

In some embodiments, eNB 101b transmits messaging to UE 104 indicating switching to the 256-QAM scheme from an existing non-256-QAM scheme. In some embodiments, eNB 101b encodes data using memory usage size based on $N_{soft}$ such that the number and value of the $N_{soft}$ for using the 256-QAM scheme is substantially equal to the number and value of the $N_{soft}$ when the eNB is not using the 256-QAM scheme. Here, various embodiments are applicable to Macro Cell 121 and small cells 122a and 122b.

FIG. 2 illustrates a block diagram of UE 200 (e.g., UE 104) with mechanisms to support seamless operation for 256-QAM coding scheme, according to some embodiments of the disclosure. It is pointed out that those elements of FIG. 2 having the same reference numbers (or names) as the elements of any other figure can operate or function in any manner similar to that described, but are not limited to such.

In some embodiments, UE 200 may include physical (PHY) layer circuitry 202, Media Access Control (MAC) circuitry 203, Processor 204, Memory 205, Packet Filter(s) 206, and Table Component 208. So as not to obscure the embodiments, a high level simplified architecture of UE 200 is described. A person skilled in the art would appreciate that other components (not shown) are also used in addition to the ones shown to form a complete UE. In some embodiments, PHY layer circuitry 202 includes Transceiver 207 for transmitting and receiving signals to and from eNB 102a/b/c/d and other eNBs. Transceiver 207 also transmits and receives signals to and from other UEs or other devices using one or more antennas 201. In some embodiments, MAC circuitry 203 controls access to the wireless medium. Processor 204 and Memory 205 are arranged to perform the operations described with reference to some embodiments.

In some embodiments, Table Component 208 is used for storing the same $N_{soft}$ which is used to derive the rate matching pattern regardless of the 256-QAM configuration and the 256-QAM support at the UE. In such embodiments, UE 200 uses the same $N_{soft}$ value as $N_{soft}$ of the associated UE not supporting the 256-QAM scheme for determination of the rate matching pattern. In some embodiments, Table Component 208 is used for storing soft channel bits based on $N_{soft}$ such that the number and value of the soft channel bits for using the 256-QAM scheme is substantially equal to the number and value of the soft channel bits when the UE is not using the 256-QAM scheme.

In some embodiments, antennas 201 may comprise one or more directional or omnidirectional antennas, including monopole antennas, dipole antennas, loop antennas, patch antennas microstrip antennas, coplanar wave antennas, or other types of antennas suitable for transmission of Radio Frequency (RF) signals. In some multiple-input multiple-output (MIMO) embodiments, antennas 201 are separated to take advantage of spatial diversity. In some embodiments, antenna 201 receives messaging from eNB indicating switching to 256-QAM scheme from an existing non-256-QAM scheme.

In some embodiments, UE 200 comprises a demodulator to demodulate signal on a PDSCH after an RRC configuration of the 256-QAM scheme. In some embodiments, the messaging is performed by RRC layer signaling. In some embodiments, the messaging is performed by MAC layer signaling using MAC circuitry 203. In some embodiments, memory 205 has a usage size which is the same usage size of the memory when the UE is not operating on the 256-QAM scheme. In some embodiments, processor 204 is operable to process signals on the PDSCH in accordance with the downlink physical layer parameter values associated with the 256-QAM scheme.

Figure 8:
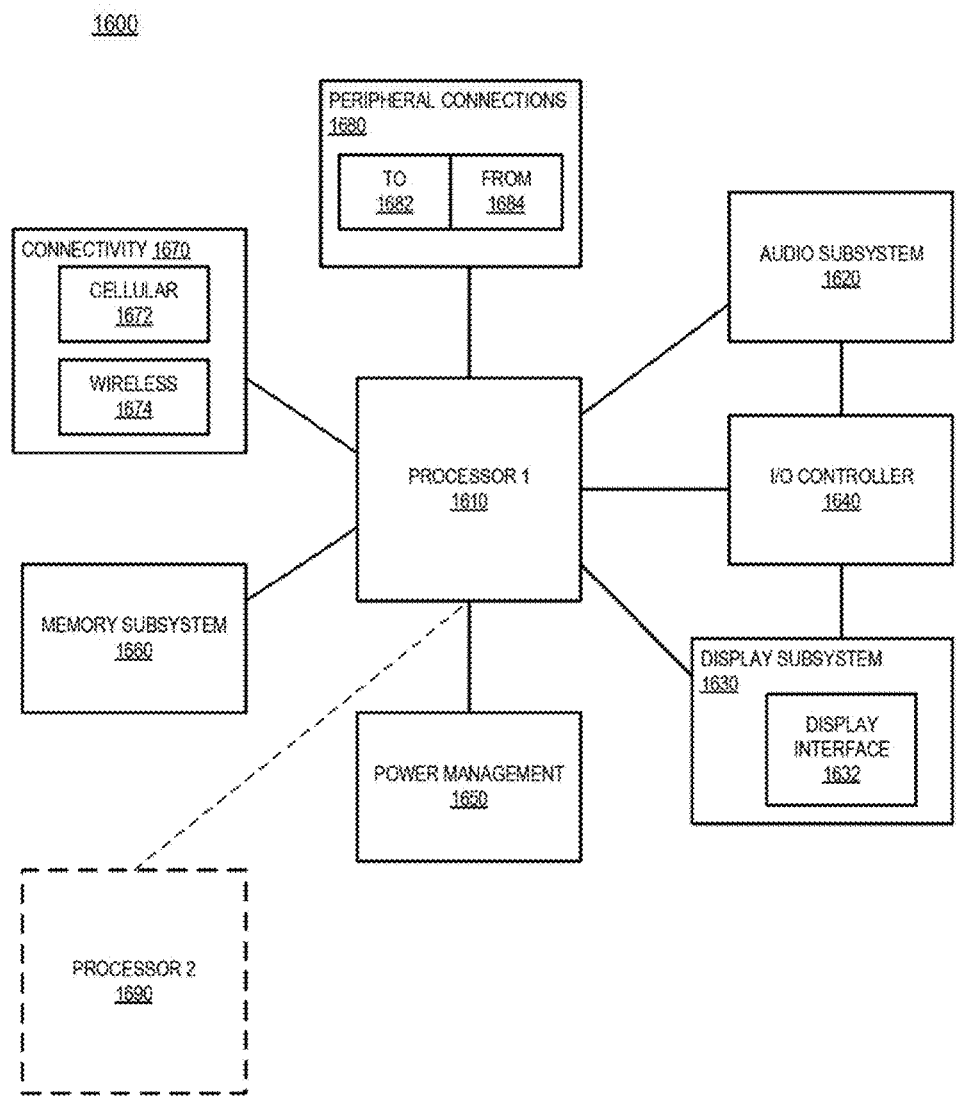
FIG. 8 illustrates a system-on-chip (SoC) with mechanisms to provide seamless operation for 256-QAM coding scheme, according to some embodiments of the disclosure.

In some embodiments, a maximum coding rate of the mother code (i.e., the code rate before the wrap around) associated with the 256-QAM scheme is higher than the maximum coding rate of the mother code associated with a non-256-QAM scheme. In some embodiments, the rate matching pattern remains the same after switching to the 256-QAM scheme. In some embodiments, UE 200 comprises logic to discard more number of parity bits for the MCS when UE 200 is configured to apply the 256-QAM scheme than discarding a number of parity bits for the MCS when UE 200 is configured to apply a non-256-QAM scheme. FIG. 8 describes another embodiment of UE 104.

FIG. 3 illustrates a block diagram of eNB 300 (e.g., one of eNB 102a/b/c/d) with mechanisms to support seamless operation for 256-QAM coding scheme, according to some embodiments of the disclosure. It should be noted that in some embodiments, eNB 300 may be a stationary non-mobile device. It is pointed out that those elements of FIG. 3 having the same reference numbers (or names) as the elements of any other figure can operate or function in any manner similar to that described, but are not limited to such.

In some embodiments, eNB 300 may include PHY layer circuitry 302, MAC circuitry 303, Processor 304, Memory 305, and Table Component 308. So as not to obscure the embodiments, a high level simplified architecture of eNB is described. A person skilled in the art would appreciate that other components (not shown) are also used in addition to the ones shown to form a complete eNB. In some embodiments, PHY layer circuitry 302 includes Transceiver 307 for transmitting and receiving signals to and from eNB 102a/b/c/d and other eNBs. Transceiver 307 also transmits and receives signals to and from other UEs or other devices using one or more antennas 301. In some embodiments, MAC circuitry 303 controls access to the wireless medium. In some embodiments, Processor 304 and Memory 305 are arranged to perform the operations described with reference to some embodiments.

In some embodiments, eNB 300 comprises Encoder 308 to encode data using memory usage size based on $N_{soft}$ such that the number and value of the $N_{soft}$ for using the 256-QAM scheme is substantially equal to the number and value of the $N_{soft}$ when the eNB is not using the 256-QAM scheme. In some embodiments, the same $N_{soft}$ is used to derive the rate matching pattern regardless of the 256-QAM configuration and the 256-QAM scheme support at the UE.

In some embodiments, antennas 301 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO embodiments, antennas 301 are separated to take advantage of spatial diversity. In some embodiments, antenna 301 transmits messaging to UE 104/200 indicating switching to the 256-QAM scheme from an existing non-256-QAM scheme.

In some embodiments, eNB 300 comprises logic to process the transport block associated with the 256-QAM scheme. In some embodiments, the size of the transport block associated with the 256-QAM scheme is larger than a transport block size of the existing non-256-QAM scheme. In some embodiments, eNB 300 comprises a modulator to modulate signal on a PDSCH after the RRC configuration of the 256-QAM scheme. In some embodiments, the messaging is performed by a RRC layer signaling. In some embodiments, the messaging is performed by a MAC layer signaling using MAC circuitry 303. In some embodiments, memory 305 has a usage size which is the same usage size of the memory when eNB 300 is not operating on 256-QAM scheme.

In some embodiments, processor 304 is operable to encode signals on the PDSCH in accordance with the downlink physical layer parameter values associated with the 256-QAM scheme. In some embodiments, a maximum coding rate of the mother code associated with the 256-QAM scheme is higher than the maximum coding rate associated with a non-256-QAM scheme. In some embodiments, the rate matching pattern remains the same after switching to the 256-QAM scheme. In some embodiments, eNB 300 comprises logic to discard more number of parity bits for MCS when eNB 300 is to apply the 256-QAM scheme than a number of parity bits discarded for the MCS when eNB 300 is to apply a non-256-QAM scheme.

Although UE 200 and eNB 300 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), etc.

Figure 4:
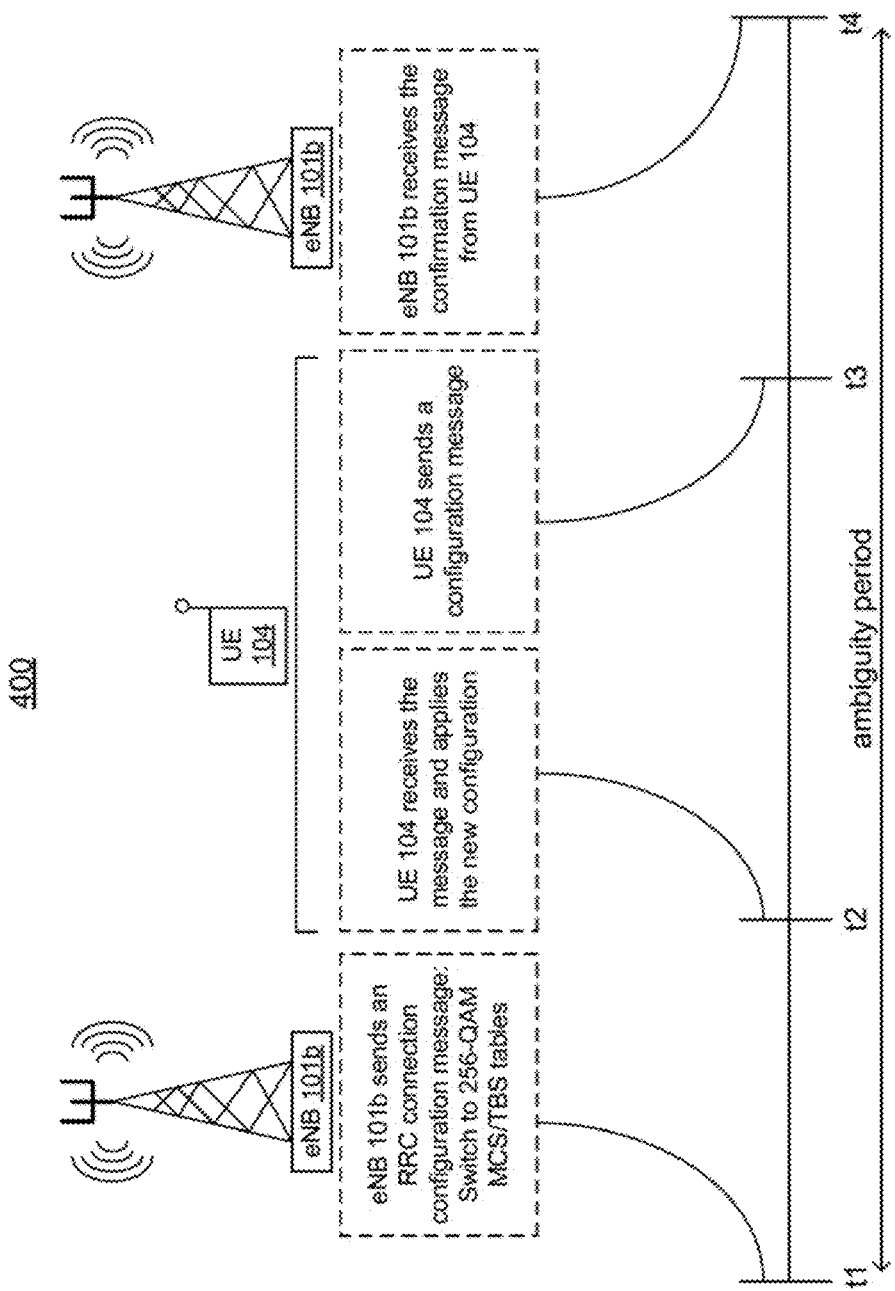
FIG. 4 illustrates a messaging timeline showing a Radio Resource Control (RRC) reconfiguration ambiguity period which is addressed by the UE and eNB to provide seamless operation for 256-QAM coding scheme, according to some embodiments of the disclosure.

FIG. 4 illustrates a messaging timeline 400 showing an RRC reconfiguration ambiguity period which is addressed by UE 104 and eNB 102a/b to provide seamless operation for 256-QAM coding scheme, according to some embodiments of the disclosure. It is pointed out that those elements of FIG. 4 having the same reference numbers (or names) as the elements of any other figure can operate or function in any manner similar to that described, but are not limited to such.

Today in LTE networks, a current channel condition (i.e., indicating the order of modulation scheme to use) is estimated by a UE. The UE then selects a Channel Quality Indicator (CQI) value which corresponds to the current condition. Table 7.2.3-1 of the $3^{rd}$ Generation Partnership Project Technical Specification (3GPP TS) 36.213 defines a four-bit CQI table that includes 16 MCSs. The UE selects one MCS out of the 16 MCSs that is considered to be the most suitable (or maximally supportable) to the current downlink channel condition. The UE then provides the selected CQI value to the eNB which corresponds to the selected MCS. The CQI indices for each of the 16 MCSs are defined in the CQI table.

The eNB, as currently defined in the 3GPP TS, then uses the CQI index for MCS selection for a communication, such as a PDSCH transmission. The eNB selects an MCS from an MCS table defined in Table 7.1.7.1-1 of the 3GPP TS 36.213. An MCS index ($I_{MCS}$) corresponding to the selected MCS is communicated to the UE on the PDCCH. The UE then uses the MCS for the corresponding communication(s). The UE uses the $I_{MCS}$ value received in the Downlink Control Information (DCI) format in conjunction with the table coded into the specification (specifically, Table 7.1.7.1-1 of the 3GPP TS 36.213) to determine the modulation order ($Q_m$) and Transport Block Size (TBS) used in the PDSCH.

The UE can then receive and decode the PDSCH based on the determined modulation order and the TBS. As mentioned before, the current modulation schemes in 3GPP peaks at 64-QAM while the improved proximity and geometry may allow for the 256-QAM coding scheme. This means that the current (or legacy) CQI table (i.e., Table 7.2.3-1) and the current (or legacy) MCS table (i.e., 7.1.7.1-1 of the 3GPP TS 36.213) support only up to the 64-QAM coding scheme. A new CQI table and a new MCS table to support higher MCSs with 256-QAM coding in a new version of LTE specification are proposed in the co-pending and co-owned U.S. patent application Ser. No. 14/498,503 filed Sep. 26, 2014, which is incorporated by reference here in its entirety.

In messaging timeline 400, four time points are shown—t1 through t4. At t1, eNB 101b sends an RRC connection configuration message to UE 104. This connection configuration message instructs UE 104 to switch to a 256-QAM scheme from a non-256-QAM scheme. In some embodiments, the RRC message transmitted by eNB 101b to UE 104 indicates to UE 104 to switch to the 256-QAM MCS TBS. At t2, UE 104 receives the message and applies the new configuration indicated by eNB 101b. At t3, UE 104 sends a configuration message to eNB 101b. At t4, eNB 101b receives the confirmation message from UE 104.

After sending the RRC connection reconfiguration message indicating switch to the 256QAM MCS/TBS table, the eNB may not exactly know when the UE applies the new configuration. This period between t1 and t4 is referred to as the RRC ambiguity period. During such an RRC ambiguity period, the MCS/TBS used at the eNB may not be appropriately interpreted by the UE. This problem of RRC configuration ambiguity is solved by a solution proposed in the co-pending and co-owned U.S. patent application Ser. No. 14/498,503 filed Sep. 26, 2014.

size $N_{soft}$ (i.e., total number of soft channel bits) provided by the using Information Element (IE) ue-Category signaling.

Table 1 shows the physical layer parameters for different UE categories supported by the LTE Rel-10 of the 3GPP TS 36.306.

TABLE 1

Current downlink physical layer parameter values set by the field ue-Category

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL | Support for 256QAM in DL | "use cases" |
|---|---|---|---|---|---|---|
| Category 1 | 10296 | 10296 | 250368 | 1 | — |  |
| Category 2 | 51024 | 51024 | 1237248 | 2 | — |  |
| Category 3 | 102048 | 75376 | 1237248 | 2 | — |  |
| Category 4 | 150752 | 75376 | 1827072 | 2 | — |  |
| Category 5 | 299552 | 149776 | 3667200 | 4 | — |  |
| Category 6 | 301504 | 149776 (4 layers) 75376 (2 layers) | 3654144 | 2 or 4 | — |  |
| Category 7 | 301504 | 149776 (4 layers) 75376 (2 layers) | 3654144 | 2 or 4 | — |  |
| Category 8 | 2998560 | 299856 | 35982720 | 8 | — |  |

One way to avoid this ambiguity problem is to index the MCSs in the MCS/TBS table in such a way that the MCS indices are the same for the MCSs common between the legacy and the 256QAM MCS/TBS tables. The RRC configuration ambiguity may still occur in the rate matching pattern, however. Rate matching pattern indicates where to wrap in the circular buffer.

In some embodiments, the RRC configuration ambiguity is resolved in the rate matching pattern by having a table component in UE 104 for storing soft channel bits based on $N_{soft}$ such that the number and value of the soft channel bits for using the 256-QAM scheme is substantially equal to the number and value of the soft channel bits when the UE is not using the 256-QAM scheme. In some embodiments, the encoder of eNB 101b encodes data using a memory usage size based on $N_{soft}$ such that the number and value of the $N_{soft}$ for using the 256-QAM scheme is substantially equal to the number and value of the $N_{soft}$ when the eNB is not using the 256-QAM scheme.

In some embodiments, the modulator of eNB 101a/b modulates signal on a PDSCH after the RRC configuration of the 256-QAM scheme (i.e., after t4). In some embodiments, the demodulator of UE 104 demodulates the modulated signal on the PDSCH after the RRC configuration of the 256-QAM scheme (i.e., after t4).

Figures 5, 6:
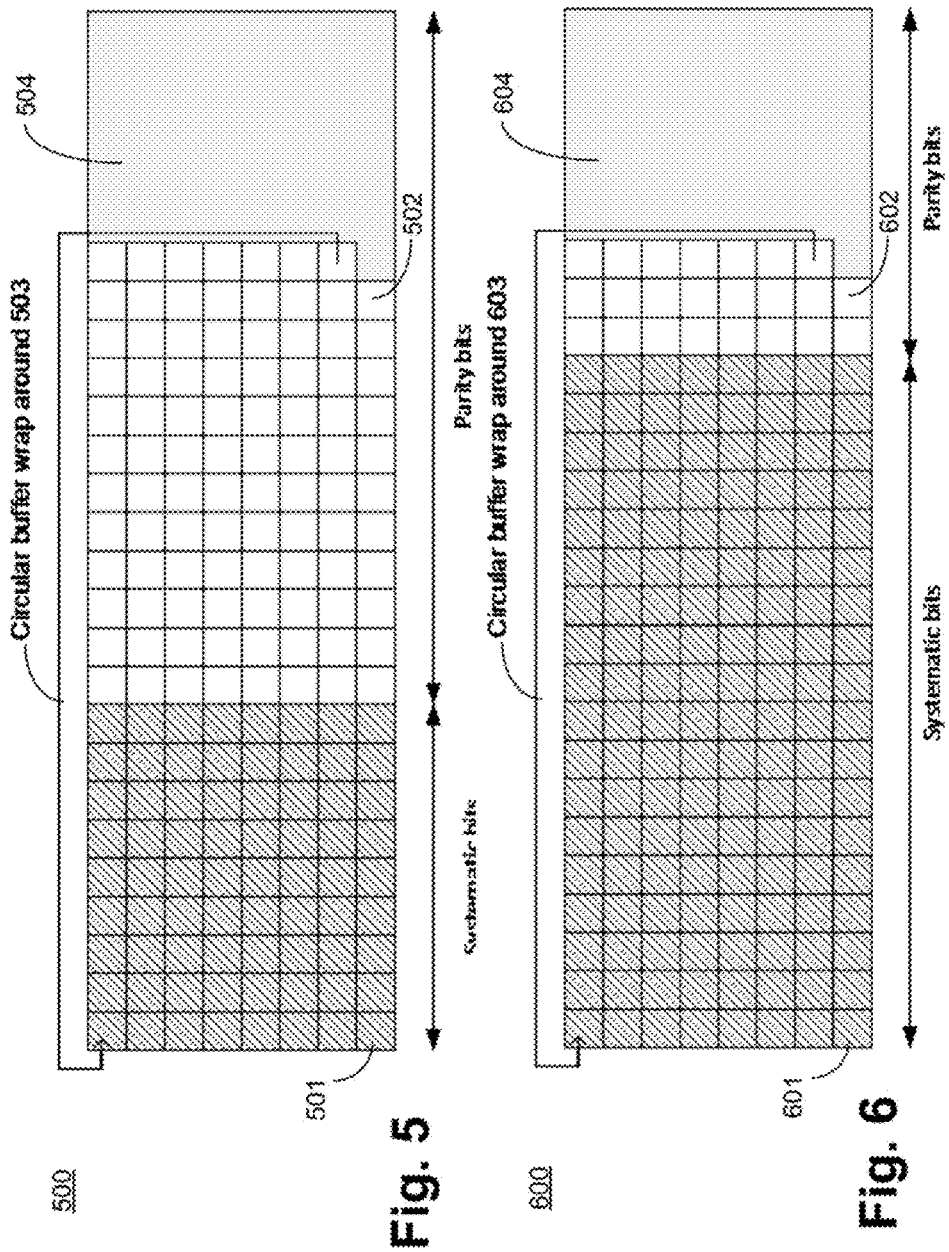
FIG. 5 illustrates a Limited Buffer Rate Matching (LBRM).
FIG. 6 illustrates an LBRM with fewer parity bits to provide seamless operation for the 256-QAM coding scheme compared to the LBRM of FIG. 5, according to some embodiments of the disclosure.

FIG. 5 illustrates a Limited Buffer Rate Matching (LBRM) 500. Rate matching procedure is specified in the 3GPP TS 36.212. In accordance to LBRM, the storage requirements at the UE for soft channel bits (as defined by Table 1 below) are reduced. $N_{soft}$ values for limited buffer size are defined in the 3GPP TS 36.306. The storage or memory usage includes systematic bits 501 and corresponding parity bits 502. The storage requirements are reduced by forcing an earlier wrap around 503 of the circular buffer (i.e., parity bits 502 are reduced as illustrated by the blank region 504 reserved for parity bits). The wrap around point (or rate matching) is calculated based on the available soft buffer Today, Rel-10 UE signals the UE categories to the network using IE ue-Category-v1020 and also indicates Category 4 or 5 depending on the signaled UE categories in the IE ue-Category-v1020. The UE categories in the IE ue-Category is Rel-8/9 category (Cats 1-5) and those in the IE ue-Category-v1020 is Rel-10 category (Cats 6-8). Signaling of two UE categories is required to provide backward compatibility access of Rel-10 Cats 6-8 UEs to the Rel-8/9 network, where the eNB can interpret Cats 1-5 only.

The parameter $N_{soft}$ of the UE category is usually selected to guarantee the coding rate of the mother code (i.e., the code rate before the wrap around point 503). Here, the coding rate is approximately 0.6 for the transport block of the maximum size. The 3GPP TS 36.212 specifies the determination of rate matching pattern (i.e., the circular soft buffer size) as follows.

Denote the soft buffer size for the transport block by $N_{IR}$ bits and the soft buffer size for the r-th code block by $N_{cb}$ bits. The size $N_{cb}$ is obtained as follows, where C is the number of code blocks computed in section 5.1.2 [3GPP TS 36.212]:

$$N_{cb} = \min\left(\left\lfloor \frac{N_{IR}}{C} \right\rfloor, K_w\right)$$

for DL-SCH and PCH transport channels
$N_{cb}=K_w$ for UL-SCH and MCH transport channels
where $N_{IR}$ is equal to:

$$N_{IR} = \left\lfloor \frac{N_{soft}}{K_C \cdot K_{MIMO} \cdot \min(M_{DL\_HARQ}, M_{limit})} \right\rfloor$$

where:
If the UE signals ue-Category-v1020, and is configured with transmission mode 9 or transmission mode 10 for the DL cell, $N_{soft}$ is the total number of soft channel bits [4] according to the UE category indicated by ue-Category-v1020 [6]. Otherwise, $N_{soft}$ is the total number of soft channel bits [4] according to the UE category indicated by ue-Category [6].

If $N_{soft}$=35982720,
$K_C$=5,
else if $N_{soft}$=3654144 and the UE is capable of supporting no more than a maximum of two spatial layers for the DL cell,
$K_C$=2
else
$K_C$=1
End if.

$K_{MIMO}$ is equal to 2 if the UE is configured to receive PDSCH transmissions based on transmission modes 3, 4, 8, 9 or 10 as defined in section 7.1 of [3], and is equal to 1 otherwise.

The 3GPP TS 36.212 specification shows that the rate matching pattern depends on the $N_{soft}$ value, which itself depends on the UE category at both sides (i.e., at the eNB and UE). For example, $N_{soft}$ can be larger when the 256-QAM scheme is configured. Then any ambiguity between the eNB and UE on this $N_{soft}$ value may prevent the correct decoding of PDSCH packets in some cases. In such LTE systems, the rate matching pattern is derived based on the UE's capability of storing soft channel bits (i.e. based on $N_{soft}$). During RRC configuration of the 256-QAM scheme (i.e., during the RRC configuration ambiguity period), the actual value of $N_{soft}$ (which is used to derive the rate matching pattern) can be different on the eNB and UE, that could prevent correct PDSCH demodulation during that period.

To address the problem, in some embodiments, UE 104 and eNB 101b use the same $N_{soft}$ to derive the rate matching pattern regardless of the 256-QAM configuration and 256-QAM support at the UE. In some embodiments, UE 104 uses the same $N_{soft}$ value as $N_{soft}$ of the associated UE not supporting the 256-QAM scheme for determination of the rate matching pattern.

In order to support a 256-QAM scheme, a new UE category can be defined in the table of 3GPP TS 36.306 (i.e., update Table 1 described in this disclosure) along with the physical layer parameters supporting the higher data rate associated with the 256-QAM scheme.

In some embodiments, the Rel-10 UE Cat 7 can be extended to Rel-12 Cat X to support 256-QAM coding scheme as shown in Table 2, where 'X' represents a future number for the UE category associated with the 256-QAM coding scheme.

TABLE 2

Downlink physical layer parameter values set by the field ue-Category

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL | Support for 256QAM in DL | "use cases" |
|---|---|---|---|---|---|---|
| Category 1 | 10296 | 10296 | 250368 | 1 | — | |
| Category 2 | 51024 | 51024 | 1237248 | 2 | — | |
| Category 3 | 102048 | 75376 | 1237248 | 2 | — | |
| Category 4 | 150752 | 75376 | 1827072 | 2 | — | |
| Category 5 | 299552 | 149776 | 3667200 | 4 | — | |
| Category 6 | 301504 | 149776 (4 layers) 75376 (2 layers) | 3654144 | 2 or 4 | — | |
| Category 7 | 301504 | 149776 (4 layers) 75376 (2 layers) | 3654144 | 2 or 4 | — | |
| Category X | 407360 | 203704 (4 layers) 101840 (2 layers) | 5481216 | 2 or 4 | Yes | "400 Mbps" 1DL + 4 layer MIMO + 256QAM 2DL CA + 2 layer MIMO + 256QAM |
| Category 8 | 2998560 | 299856 | 35982720 | 8 | — | |

In some embodiments, for backwards compatibility support with eNBs of the previous releases, Rel-12 Cat X UE can also signal one associated UE category from the previous releases (e.g., Cat 7 in Rel-10) not supporting a 256-QAM coding scheme. In the example in Table 2, the total number of soft channel bits $N_{soft}$=5481216 (for the new UE Cat X with support of 256-QAM) is higher than the number of soft channel bits $N_{soft}$=3654144 of the associated UE Cat 7 without support of a 256-QAM coding scheme.

A larger number of soft channel bits guarantees the mother coding rate of 0.5946 (in accordance to Rel-8 design criteria), when the 256-QAM transport block with the maximum size is used. However, the rate matching pattern derived based on the larger $N_{soft}$=5481216 is not backwards compatible with the rate matching pattern of associated Rel-10 UE Cat 7 derived based on $N_{soft}$=3654144. In other words, UE switching $N_{soft}$ from 3654144 to 5481216 after RRC configuration of 256-QAM may not follow the rate matching assumption of the eNB and, therefore, may not be able to correctly receive the PDSCH packets.

In some embodiments, for a new 256-QAM capable UE 104 with Rel-12 Cat X, the same $N_{soft}$ value as the $N_{soft}$ of the associated Rel-10 or Rel-11 UE Cat (e.g., UE Cat 7) not supporting 256-QAM coding scheme is used for the determination of the rate matching pattern. Some embodiments can be captured in the 3GPP TS 36.212 specification as follows.

Denote the soft buffer size for the transport block by $N_{IR}$ bits and the soft buffer size for the r-th code block by $N_{cb}$ bits. The size $N_{cb}$ is obtained as follows, where C is the number of code blocks computed in section 5.1.2:

$$N_{cb} = \min\left(\left\lfloor \frac{N_{IR}}{C} \right\rfloor, K_w\right)$$

for DL-SCH and PCH transport channels $N_{cb}=K_w$ for UL-SCH and MCH transport channels where $N_{IR}$ is equal to:

$$N_{IR} = \left\lfloor \frac{N_{soft}}{K_C \cdot K_{MIMO} \cdot \min(M_{DL\_HARQ}, M_{limit})} \right\rfloor$$

where:

If the UE signals ue-Category-v1020 or ue-Category-v12xy, and is configured with transmission mode 9 or transmission mode 10 for the DL cell, $N_{soft}$ is the total number of soft channel bits [4] according to the UE category indicated by ue-Category-v1020 [6]. Otherwise, $N_{soft}$ is the total number of soft channel bits [4] according to the UE category indicated by ue-Category [6].

If $N_{soft}$=35982720, $K_C$=5, else if $N_{soft}$=3654144 and the UE is capable of supporting no more than a maximum of two spatial layers for the DL cell, $K_C$=2 else $K_C$=1

End if.

$K_{MIMO}$ is equal to 2 if the UE is configured to receive PDSCH transmissions based on transmission modes 3, 4, 8, 9 or 10 as defined in section 7.1 of [3], and is equal to 1 otherwise.

Here, "ue-Category-v12xy" IE supports signaling of the 256-QAM UE category.

FIG. 6 illustrates LBRM 600 with fewer parity bits to provide seamless operation for the 256-QAM coding scheme compared to LBRM 500 of FIG. 5, according to some embodiments of the disclosure. It is pointed out that those elements of FIG. 6 having the same reference numbers (or names) as the elements of any other figure can operate or function in any manner similar to that described, but are not limited to such.

In some embodiments, the method performed by UE 104 and eNB 101b to provide seamless operation for a 256-QAM coding scheme leads to the discarding of a larger number of parity bits in LBRM 600. The resulting mother coding rate in the considered example is equal 0.8919 for the largest 256-QAM TBS, which is still decodable at UE 104.

In accordance to LBRM 600, the storage requirements at the UE for soft channel bits (as defined by Table 3 below) are reduced. The storage or memory usage includes systematic bits 601 and corresponding parity bits 602. The storage requirements are reduced by forcing an earlier wrap around 603 of the circular buffer (i.e., parity bits 602 are reduced as illustrated by the blank region 604 reserved for parity bits).

In some embodiments, for a new Rel-12 UE category supporting a 256-QAM coding scheme, the same value of total number of soft channel bits (e.g., 3654144) are reused as used in an associated UE category from the previous LTE release not supporting a 256-QAM coding scheme (e.g. the same as Cat 7 in Rel-10). The example of this embodiment is captured in Table 3 below, where the total number of soft channel bits is the same for Cat 7 and Cat X (i.e., 3654144).

TABLE 3

Downlink physical layer parameter values set by the field ue-Catagory, according to some embodiments

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL | Support for 256QAM in DL | "use cases" |
|---|---|---|---|---|---|---|
| Category 1 | 10296 | 10296 | 250368 | 1 | — | |
| Category 2 | 51024 | 51024 | 1237248 | 2 | — | |
| Category 3 | 102048 | 75376 | 1237248 | 2 | — | |
| Category 4 | 150752 | 75376 | 1827072 | 2 | — | |
| Category 5 | 299552 | 149776 | 3667200 | 4 | — | |
| Category 6 | 301504 | 149776 (4 layers) 75376 (2 layers) | 3654144 | 2 or 4 | — | |
| Category 7 | 301504 | 149776 (4 layers) 75376 (2 layers) | 3654144 | 2 or 4 | — | |

TABLE 3-continued

Downlink physical layer parameter values set by the field ue-Catagory, according to some embodiments

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL | Support for 256QAM in DL | "use cases" |
|---|---|---|---|---|---|---|
| Category X | 407360 | 203704 (4 layers) 101840 (2 layers) | 3654144 | 2 or 4 | Yes | "400 Mbps" 1DL + 4 layer MIMO + 256QAM 2DL CA + 2 layer MIMO + 256QAM |
| Category 8 | 2998560 | 299856 | 35982720 | 8 | — | |

One technical effect of some embodiments is that UE 104 avoids the ambiguity in the rate matching pattern during configuration of the 256-QAM coding scheme at the expense of additional discarding of the parity bits for the 256-QAM MCSs. Some embodiments, facilitate correct demodulation of PDSCH during RRC configuration of 256-QAM.

Figure 7:
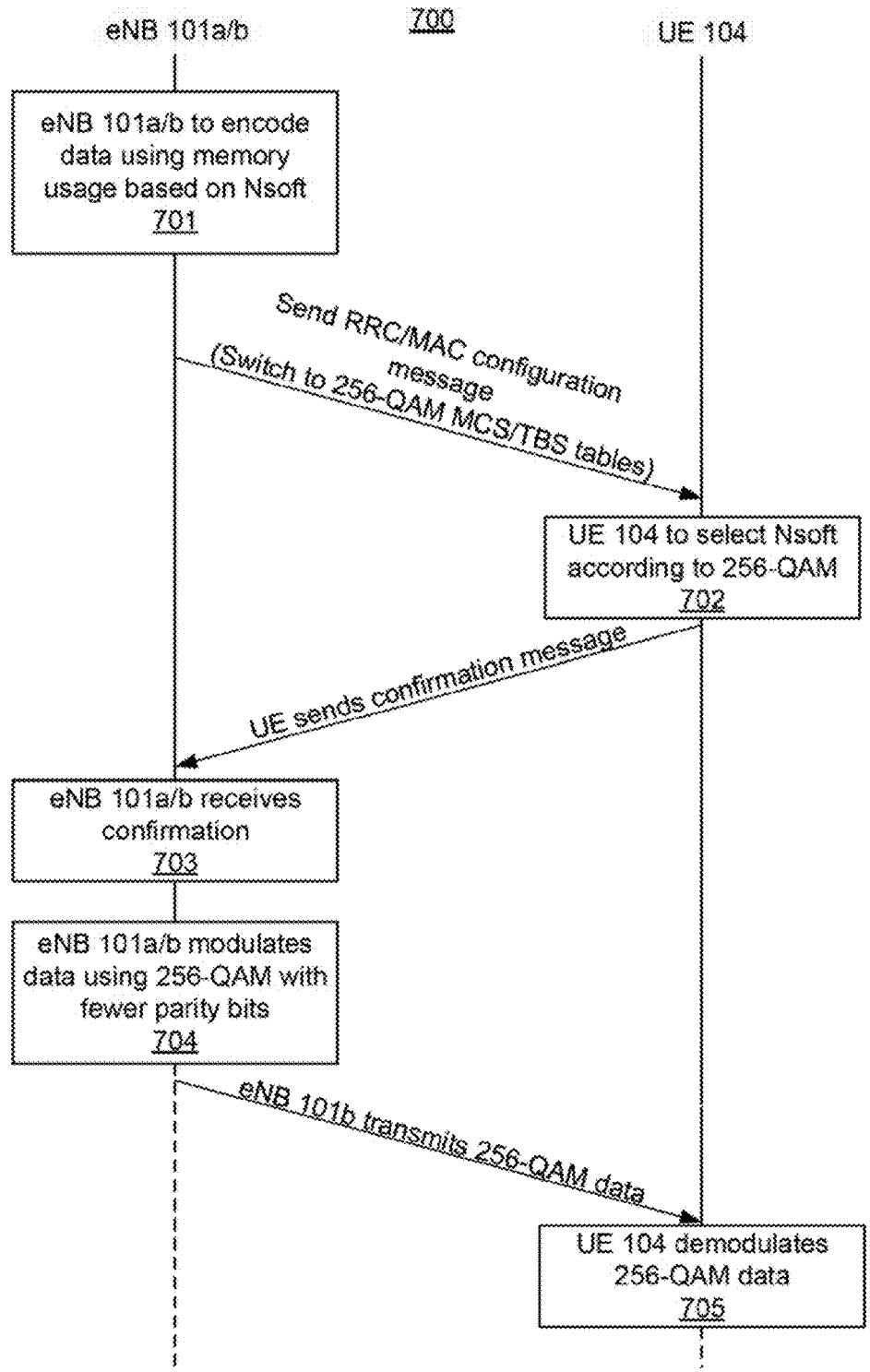
FIG. 7 illustrates a flowchart of a method performed by the UE and eNB to provide seamless operation for 256-QAM coding scheme, according to some embodiments of the disclosure.

FIG. 7 illustrates flowchart 700 of a method performed by UE 104 and eNB 101b to provide seamless operation for 256-QAM coding scheme, according to some embodiments of the disclosure. It is pointed out that those elements of FIG. 7 having the same reference numbers (or names) as the elements of any other figure can operate or function in any manner similar to that described, but are not limited to such.

Although the blocks and/or operations in the flowchart with reference to FIG. 7 are shown in a particular order, the order of the actions can be modified. Thus, the illustrated embodiments can be performed in a different order, and some actions/blocks may be performed in parallel. Some of the blocks and/or operations listed in FIG. 7 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 701, eNB 101a/b encodes data using memory usage size based on $N_{soft}$ such that the number and value of the $N_{soft}$ for using the 256-QAM scheme is substantially equal to the number and value of the $N_{soft}$ when the eNB is not using the 256-QAM scheme. eNB 101a/b then transmits messaging to UE 104 indicating switching to 256-QAM scheme from an existing non-256-QAM scheme. In some embodiments, the messaging is performed by RRC layer signaling. In some embodiments, the messaging is performed by MAC layer signaling.

At block 702, UE 104 receives messaging from eNB 101a/b indicating switching to 256-QAM scheme from an existing non-256-QAM scheme. In some embodiments, the messaging is performed by RRC layer signaling. In some embodiments, the messaging is performed by MAC layer signaling. In some embodiments, UE 104 stores soft channel bits based on $N_{soft}$ such that the number and value of the soft channel bits for using the 256-QAM scheme is substantially equal to the number and value of the soft channel bits when the UE is not using the 256-QAM scheme. UE 104 then sends a confirmation message to eNB 101a/b that it has configured the 256-QAM coding scheme. For example, since the rate matching pattern is kept the same, UE 104 indicates that the 256-QAM coding scheme is configured and can be used by eNB 102a/b for PDSCH transmission. In some embodiments, the rate matching pattern remains the same after switching to the 256-QAM scheme.

At block 703, eNB 101a/b receives confirmation from UE 104 that the UE has configured the 256-QAM scheme. At block 704, modulator of eNB 101a/b modulates signal on the PDSCH after RRC configuration of the 256-QAM scheme. In some embodiments, eNB 101a/b encodes signals on the PDSCH in accordance with the downlink physical layer parameter values associated with the 256-QAM scheme. In some embodiments, the memory of eNB 101a/b has a usage size which is the same usage size of the memory when the eNB is not operating on a 256-QAM scheme.

In some embodiments, eNB 101a/b discards more number of parity bits for MCS when the eNB is to apply the 256-QAM scheme than a number of parity bits discarded for the MCS when the eNB is to apply a non-256-QAM scheme. In some embodiments, logic of eNB 101a/b processes transport block associated with the 256-QAM scheme, where the transport block is a size larger than a transport block size of the existing non-256-QAM scheme. In some embodiments, the rate matching pattern at eNB 101a/b remains the same after switching to the 256-QAM scheme. In some embodiments, the maximum coding rate of the mother code associated with the 256-QAM scheme is higher than the maximum coding rate associated with a non-256-QAM scheme.

At block 705, UE 104 demodulates signal on the PDSCH after a RRC configuration of the 256-QAM scheme. In some embodiments, UE 104 processes transport block associated with the 256-QAM scheme, wherein the transport block is a size larger than a transport block size of the existing non-256-QAM scheme. In some embodiments, the memory of UE 104 has a usage size which is the same usage size of the memory when UE 104 is not operating on a 256-QAM scheme. In some embodiments, the processor of UE 104 is operable to process signals on the PDSCH in accordance with the downlink physical layer parameter values associated with the 256-QAM scheme. In some embodiments, the maximum coding rate of the mother code associated with the 256-QAM scheme is higher than the maximum coding rate associated with a non-256-QAM scheme. In some embodiments, UE 104 discards more number of parity bits for MCS when UE 104 is configured to apply the 256-QAM scheme than a number of parity bits discarded for the MCS when UE 104 is configured to apply a non-256-QAM scheme.

FIG. 8 illustrates a SoC (e.g., UE 104/200) with mechanisms to provide seamless operation for a 256-QAM coding scheme. It is pointed out that those elements of FIG. 8 having the same reference numbers (or names) as the elements of any other figure can operate or function in any manner similar to that described, but are not limited to such.

UE 1600 may be a smart device or a computer system or a SoC with mechanisms to provide seamless operation for 256-QAM coding scheme, according to some embodiments of the disclosure. FIG. 8 illustrates a block diagram of an embodiment of a mobile device in which flat surface interface connectors could be used. In some embodiments, UE 1600 represents a mobile computing device, such as a computing tablet, a mobile phone or smart-phone, a wireless-enabled e-reader, or other wireless mobile device. It will be understood that certain components are shown generally, and not all components of such a device are shown in UE 1600.

In some embodiments, UE 1600 includes a first processor 1610 with mechanisms to provide seamless operation for a 256-QAM coding scheme, according to some embodiments discussed. Other blocks of the UE 1600 may also include the mechanisms to provide seamless operation for a 256-QAM coding scheme of some embodiments. The various embodiments of the present disclosure may also comprise a network interface within 1670 such as a wireless interface so that a system embodiment may be incorporated into a wireless device, for example, cell phone or personal digital assistant.

In some embodiments, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the UE 1600 to another device. The processing operations may also include operations related to audio I/O and/or display I/O.

In some embodiments, UE 1600 includes audio subsystem 1620, which represents hardware (e.g., audio hardware and audio circuits) and software (e.g., drivers, codecs) components associated with providing audio functions to the UE. Audio functions can include speaker and/or headphone output, as well as microphone input. Devices for such functions can be integrated into UE 1600, or connected to the UE 1600. In one embodiment, a user interacts with the UE 1600 by providing audio commands that are received and processed by processor 1610.

In some embodiments, UE 1600 includes display subsystem 1630. Display subsystem 1630 represents hardware (e.g., display devices) and software (e.g., drivers) components that provide a visual and/or tactile display for a user to interact with the UE 1600. Display subsystem 1630 includes display interface 1632, which includes the particular screen or hardware device used to provide a display to a user. In one embodiment, display interface 1632 includes logic separate from processor 1610 to perform at least some processing related to the display. In some embodiments, display subsystem 1630 includes a touch screen (or touch pad) device that provides both output and input to a user.

In some embodiments, UE 1600 comprises I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to UE 1600 through which a user might interact with the system. For example, devices that can be attached to the UE 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the UE 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the UE 1600 to provide I/O functions managed by I/O controller 1640.

In some embodiments, I/O controller 1640 manages devices such as accelerometers, cameras, light sensors or other environmental sensors, or other hardware that can be included in the UE 1600. The input can be part of direct user interaction, as well as providing environmental input to the system to influence its operations (such as filtering for noise, adjusting displays for brightness detection, applying a flash for a camera, or other features).

In some embodiments, UE 1600 includes power management 1650 that manages battery power usage, charging of the battery, and features related to power saving operation. Memory subsystem 1660 includes memory devices for storing information in UE 1600. Memory can include non-volatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the UE 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, connectivity 1670 includes hardware devices (e.g., wireless and/or wired connectors and communication hardware) and software components (e.g., drivers, protocol stacks) to enable the UE 1600 to communicate with external devices. The UE 1600 could be separate devices, such as other computing devices, wireless access points or base stations, as well as peripherals such as headsets, printers, or other devices.

In some embodiments, connectivity 1670 can include multiple different types of connectivity. To generalize, the UE 1600 is illustrated with cellular connectivity 1672 and wireless connectivity 1674. Cellular connectivity 1672 refers generally to cellular network connectivity provided by wireless carriers, such as provided via GSM or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

In some embodiments, UE 1600 comprises peripheral connections 1680. Peripheral connections 1680 include hardware interfaces and connectors, as well as software components (e.g., drivers, protocol stacks) to make peripheral connections. It will be understood that the UE 1600 could both be a peripheral device ("to" 1682) to other computing devices, as well as have peripheral devices ("from" 1684) connected to it. The UE 1600 commonly has a "docking" connector to connect to other computing devices for purposes such as managing (e.g., downloading and/or uploading, changing, synchronizing) content on UE 1600. Additionally, a docking connector can allow UE 1600 to connect to certain peripherals that allow the UE 1600 to control content output, for example, to audiovisual or other systems.

In addition to a proprietary docking connector or other proprietary connection hardware, the UE 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, a UE is provided to communicate with an eNB on a network, wherein the UE comprises hardware processing circuitry which includes: an antenna to receive messaging from eNB indicating switching to 256-QAM scheme from an existing non-256-QAM scheme; and a table component for storing soft channel bits based on a total number of the soft channel bits ($N_{soft}$) such that the number and value of the soft channel bits for using the 256-QAM scheme is substantially equal to the number and value of the soft channel bits when the UE is not using the 256-QAM scheme.

In some embodiments, the UE comprises logic to process transport block associated with 256-QAM scheme, wherein the transport block has a size larger than a transport block size of the existing non-256-QAM scheme. In some embodiments, the UE comprises a demodulator to demodulate signal on a PDSCH after a RRC configuration of the 256-QAM scheme. In some embodiments, the messaging is performed by a RRC layer signaling. In some embodiments, the messaging is performed by a MAC layer signaling.

In some embodiments, the UE comprises a memory having a usage size which is same as a usage size of the memory when the UE is not operating on 256-QAM scheme. In some embodiments, the UE comprises a processor, which is operable to process signals on PDSCH in accordance to downlink physical layer parameter values associated with the 256-QAM scheme. In some embodiments, a maximum coding rate of a mother code associated with the 256-QAM scheme is higher than the maximum coding rate associated with a non-256-QAM scheme.

In some embodiments, rate matching pattern remains the same after switching to the 256-QAM scheme. In some embodiments, the UE comprises logic to discard more number of parity bits for modulation and coding scheme (MCS) when the UE is configured to apply the 256-QAM scheme than discarding a number of parity bits for MCS when the UE is configured to apply a non-256-QAM scheme.

In another example, an eNB is provided to communicate with one or more UEs on a network, wherein the eNB comprises hardware processing circuitry including: an antenna to transmit messaging to a UE indicating switching to 256-quadrature QAM scheme from an existing non-256-QAM scheme; and an encoder to encode data using memory usage size based on a total number of soft channel bits ($N_{soft}$) such that the number and value of the $N_{soft}$ for using the 256-QAM scheme is substantially equal to the number and value of the $N_{soft}$ when the eNB is not using the 256-QAM scheme.

In some embodiments, the eNB comprises logic to process transport block associated with the 256-QAM scheme, wherein the transport block has a size larger than a transport block size of the existing non-256-QAM scheme. In some embodiments, the eNB comprises a modulator to modulate signal on a PDSCH after RRC configuration of the 256-QAM scheme. In some embodiments, the messaging is performed by a RRC layer signaling. In some embodiments, the messaging is performed by a MAC layer signaling.

In some embodiments, the eNB comprises a memory having a usage size which is same as a usage size of the memory when the eNB is not operating on 256-QAM scheme. In some embodiments, the eNB comprises a processor, which is operable to encode signals on PDSCH in accordance to downlink physical layer parameter values associated with the 256-QAM scheme. In some embodiments, a maximum coding rate of a mother code associated with the 256-QAM scheme is higher than the maximum coding rate associated with a non-256-QAM scheme. In some embodiments, rate matching pattern remains the same after switching to the 256-QAM scheme. In some embodiments, the eNB comprises logic to discard more number of parity bits for modulation and coding scheme (MCS) when the eNB is to apply the 256-QAM scheme than discarding a number of parity bits for MCS when the eNB is to apply a non-256-QAM scheme.

In another example, a method performed by a UE is provided which comprises: receiving messaging from eNB indicating switching to 256-QAM scheme from an existing non-256-QAM scheme; and storing, in a table component, soft channel bits based on a total number of the soft channel bits ($N_{soft}$) such that the number and value of the soft channel bits for using the 256-QAM scheme is substantially equal to the number and value of the soft channel bits when the UE is not using the 256-QAM scheme.

In some embodiments, the method comprises processing transport block associated with 256-QAM scheme, wherein the transport block has a size larger than a transport block size of the existing non-256-QAM scheme. In some embodiments, the method comprises: demodulating a signal on a PDSCH after a radio resource control (RRC) configuration of the 256-QAM scheme. In some embodiments, the messaging is performed by a RRC layer signaling. In some embodiments, the messaging is performed by a MAC layer signaling. In some embodiments, the method comprises processing signals on PDSCH in accordance to downlink physical layer parameter values associated with the 256-QAM scheme.

In some embodiments, a maximum coding rate of a mother code associated with the 256-QAM scheme is higher than the maximum coding rate associated with a non-256-QAM scheme. In some embodiments, rate matching pattern remains the same after switching to the 256-QAM scheme. In some embodiments, the method comprises: discarding more number of parity bits for MCS when the UE is configured to apply the 256-QAM scheme than discarding a number of parity bits for MCS when the UE is configured to apply a non-256-QAM scheme.

In another example, a UE is provided which comprises: means for receiving messaging from eNB indicating switching to 256-QAM scheme from an existing non-256-QAM scheme; and means for storing, in a table component, soft channel bits based on a total number of the soft channel bits ($N_{soft}$) such that the number and value of the soft channel bits for using the 256-QAM scheme is substantially equal to the number and value of the soft channel bits when the UE is not using the 256-QAM scheme.

In some embodiments, the UE comprises means for processing transport block associated with 256-QAM scheme, wherein the transport block has a size larger than a transport block size of the existing non-256-QAM scheme. In some embodiments, the UE comprises means for demodulating a signal on a PDSCH after a RRC configuration of the 256-QAM scheme. In some embodiments, the messaging is performed by a RRC layer signaling. In some embodiments, the messaging is performed by a MAC layer signaling. In some embodiments, the UE comprises means for processing signals on PDSCH in accordance to downlink physical layer parameter values associated with the 256-QAM scheme.

In some embodiments, a maximum coding rate of a mother code associated with the 256-QAM scheme is higher than the maximum coding rate associated with a non-256-QAM scheme. In some embodiments, rate matching pattern remains the same after switching to the 256-QAM scheme. In some embodiments, the UE comprises means for discarding more number of parity bits for MCS when the UE is configured to apply the 256-QAM scheme than discarding a number of parity bits for MCS when the UE is configured to apply a non-256-QAM scheme.

In another example, a machine readable storage media is provided having instructions stored thereon that, when executed, cause one or more processors to perform a method to the method described above.

In another example, a method is provided which is performed by an eNB, wherein the method comprises: transmitting messaging to a UE indicating switching to 256-QAM scheme from an existing non-256-QAM scheme; and encoding data using memory usage size based on a total number of soft channel bits ($N_{soft}$) such that the number and value of the $N_{soft}$ for using the 256-QAM scheme is substantially equal to the number and value of the $N_{soft}$ when the eNB is not using the 256-QAM scheme.

In some embodiments, the method comprises processing transport block associated with the 256-QAM scheme, wherein the transport block has a size larger than a transport block size of the existing non-256-QAM scheme. In some embodiments, the method comprises modulating signal on a PDSCH after RRC configuration of the 256-QAM scheme. In some embodiments, the messaging is performed by a RRC layer signaling. In some embodiments, the messaging is performed by a MAC layer signaling. In some embodiments, the method comprises encoding signals on PDSCH in accordance to downlink physical layer parameter values associated with the 256-QAM scheme.

In some embodiments, a maximum coding rate of a mother code associated with the 256-QAM scheme is higher than the maximum coding rate associated with a non-256-QAM scheme. In some embodiments, rate matching pattern remains the same after switching to the 256-QAM scheme. In some embodiments, the method comprises: discarding more number of parity bits for MCS when the eNB is to apply the 256-QAM scheme than discarding a number of parity bits for MCS when the eNB is to apply a non-256-QAM scheme.

In another example, a machine readable storage media having instructions stored thereon that, when executed, cause one or more processors to perform a method according to the method described above.

In another example, an eNB is provided which comprises: means for transmitting messaging to a UE indicating switching to 256-QAM scheme from an existing non-256-QAM scheme; and means for encoding data using memory usage size based on a total number of soft channel bits ($N_{soft}$) such that the number and value of the $N_{soft}$ for using the 256-QAM scheme is substantially equal to the number and value of the $N_{soft}$ when the eNB is not using the 256-QAM scheme. In some embodiments, the eNB comprises means for processing transport block associated with the 256-QAM scheme, wherein the transport block has a size larger than a transport block size of the existing non-256-QAM scheme.

In some embodiments, the eNB comprises means for modulating signal on a PDSCH after RRC configuration of the 256-QAM scheme. In some embodiments, the messaging is performed by a RRC layer signaling. In some embodiments, the messaging is performed by a MAC layer signaling. In some embodiments, the eNB comprises means for encoding signals on PDSCH in accordance to downlink physical layer parameter values associated with the 256-QAM scheme.

In some embodiments, a maximum coding rate of a mother code associated with the 256-QAM scheme is higher than the maximum coding rate associated with a non-256-QAM scheme. In some embodiments, rate matching pattern remains the same after switching to the 256-QAM scheme. In some embodiments, means for discarding more number of parity bits for MCS when the eNB is to apply the 256-QAM scheme than discarding a number of parity bits for MCS when the eNB is to apply a non-256-QAM scheme.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising a processing circuitry, the processing circuitry to:
   demodulate, by a demodulator, a message, wherein the message is to indicate switching to a 256-quadradture amplitude modulation (QAM) scheme from an existing non-256-QAM scheme;
   a memory to store soft channel bits such that a number of the soft channel bits for using the 256-QAM scheme is substantially equal to a number of the soft channel bits while a user equipment (UE) is using the existing non-256-QAM scheme, wherein the existing non-256-QAM scheme is to support a maximum number of 2 or 4 layers for spatial multiplexing in downlink; and
   logic to discard a greater number of parity bits for modulation and coding scheme (MCS) when the UE is configured to apply the 256-QAM scheme than a number of parity bits for MCS that are discarded when the UE is configured to apply a non-256-QAM scheme.

2. The apparatus of claim 1, comprising logic to process a transport block associated with the 256-QAM scheme, wherein the transport block has a size larger than a transport block size of the existing non-256-QAM scheme.

3. The apparatus of claim 1, comprising the demodulator to demodulate signal on a Physical downlink signal channel (PDSCH) after a radio resource control (RRC) configuration of the 256-QAM scheme.

4. The apparatus of claim 1, wherein the message is provided over a radio resource control (RRC) layer signaling.

5. The apparatus of claim 1, wherein the message is performed over a media access control (MAC) layer signaling.

6. The apparatus of claim 1, comprising another memory having a usage size which is the same as a usage size of the memory while the UE is not operating on the 256-QAM scheme.

7. The apparatus of claim 1, comprising a processor, which is operable to process signals on a Physical downlink signal channel (PDSCH) in accordance to downlink physical layer parameter values associated with the 256-QAM scheme.

8. The apparatus of claim 1, wherein a maximum coding rate of a mother code associated with the 256-QAM scheme is higher than the maximum coding rate associated with the existing non-256-QAM scheme.

9. The apparatus of claim 1, wherein a rate matching pattern remains the same after switching to the 256-QAM scheme.

10. A non-transitory computer readable storage media having instructions stored thereon that, when executed, cause one or more processors of a user equipment (UE) to perform an operation comprising:
    demodulating, by a demodulator, a message, wherein the message is to indicate switching to a 256-quadradture amplitude modulation (QAM) scheme from an existing non-256-QAM scheme;
    storing soft channel bits in a memory such that a number of the soft channel bits for using the 256-QAM scheme is substantially equal to a number of the soft channel bits while the user equipment is using the existing non-256-QAM scheme, wherein the existing non-256-QAM scheme is to support a maximum number of 2 or 4 layers for spatial multiplexing in downlink; and
    discarding a greater number of parity bits for modulation and coding scheme (MCS) when the UE is configured to apply the 256-QAM scheme than a number of parity bits for MCS that are discarded when the UE is configured to apply a non-256-QAM scheme.

11. The non-transitory computer readable storage media of claim 10 having further instructions that when executed cause the one or more processors of the UE to perform a further operation comprising processing a transport block associated with the 256-QAM scheme, wherein the transport block has a size larger than a transport block size of the existing non-256-QAM scheme.

12. The non-transitory computer readable storage media of claim 10 having further instructions that when executed cause the one or more processors of the UE to perform a further operation comprising demodulating signal on a Physical downlink signal channel (PDSCH) after a radio resource control (RRC) configuration of the 256-QAM scheme.

13. The non-transitory computer readable storage media of claim 10, wherein the message is provided over a radio resource control (RRC) layer signaling.

14. The non-transitory computer readable storage media of claim 10, wherein the message is provided over a media access control (MAC) layer signaling.

15. The non-transitory computer readable storage media of claim 10 having further instructions that when executed cause the one or more processors of the UE to perform a further operation comprising storing the soft channel bits in another memory having a usage size which is the same as a usage size of the memory while the UE is not operating on the 256-QAM scheme.

16. The non-transitory computer readable storage media of claim 10 having further instructions that when executed cause the one or more processors of the UE to perform a further operation comprising processing signals on a Physical downlink signal channel (PDSCH) in accordance to downlink physical layer parameter values associated with the 256-QAM scheme.

17. The non-transitory computer readable storage media of claim 10, wherein a maximum coding rate of a mother code associated with the 256-QAM scheme is higher than the maximum coding rate associated with the existing non-256-QAM scheme.

18. The non-transitory computer readable storage media of claim 10, wherein a rate matching pattern remains the same after switching to the 256-QAM scheme.

* * * * *